United States Patent

Aubry

[11] 4,361,415
[45] Nov. 30, 1982

[54] ROTARY-WING AIRCRAFT ROTOR HAVING A COMPACT ARTICULATED HUB

[75] Inventor: Jacques A. Aubry, Cabries, France

[73] Assignee: Societe Nationale Industrielle Aerospatiale, France

[21] Appl. No.: 156,287

[22] Filed: Jun. 4, 1980

[30] Foreign Application Priority Data

Jun. 5, 1979 [FR] France ............................. 79 14297

[51] Int. Cl.³ ............................................. B64C 27/38
[52] U.S. Cl. ................................ 416/134 A; 416/140; 416/141
[58] Field of Search .......... 416/134 A, 138 A, 140 A, 416/141, 230 A

[56] References Cited

U.S. PATENT DOCUMENTS

| 3,111,172 | 11/1963 | Gorndt et al. | 416/141 X |
| 3,282,350 | 11/1966 | Kosovec | 416/134 A X |
| 3,292,712 | 12/1966 | Schmidt | 416/141 X |
| 3,556,673 | 1/1971 | Killian | 416/134 A |
| 3,700,352 | 10/1973 | Gorndt | 416/134 A |
| 3,761,199 | 9/1973 | Ferris et al. | 416/134 A |
| 3,790,302 | 2/1974 | Pascher | 416/134 A |
| 4,135,856 | 1/1979 | McGuire | 416/134 A |
| 4,249,862 | 2/1981 | Waddington et al. | 416/140 X |
| 4,268,222 | 5/1981 | Bernard | 416/143 X |
| 4,297,078 | 10/1981 | Martin | 416/141 X |

Primary Examiner—Everette A. Powell, Jr.
Attorney, Agent, or Firm—Karl W. Flocks; A. Fred Starobin

[57] ABSTRACT

The invention relates to a rotary-wing aircraft rotor.

The rotor comprises a hub 1 connected to each blade 7a by a rigid yoke 8-9 gripping the root of blade 7a and a spherical abutment 17 secured at its center C to radial arms 5a, 6a of hub 1 and bearing on its convex side against the inner end of yoke 8-9. According to the invention, an annular visco-elastic shock-absorber 20, constituting a frequency-matching device, is disposed between the yoke 8-9 associated with each blade 7a and the corresponding pitch control device 24-29.

The invention is of use inter alia in the manufacture of fast helicopter rotors having a hub which is very compact and can therefore be easily streamlined.

10 Claims, 5 Drawing Figures

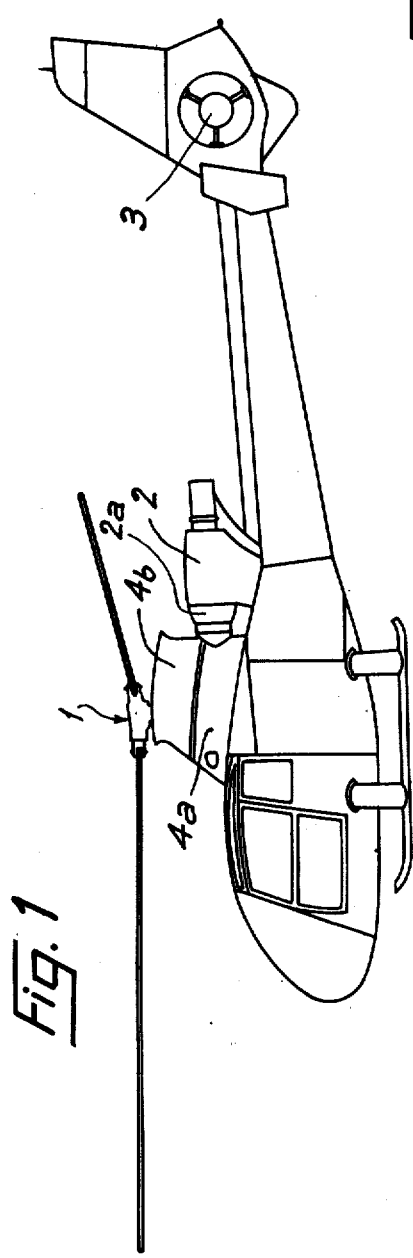
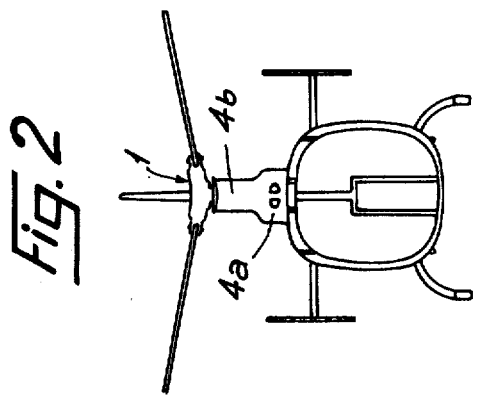
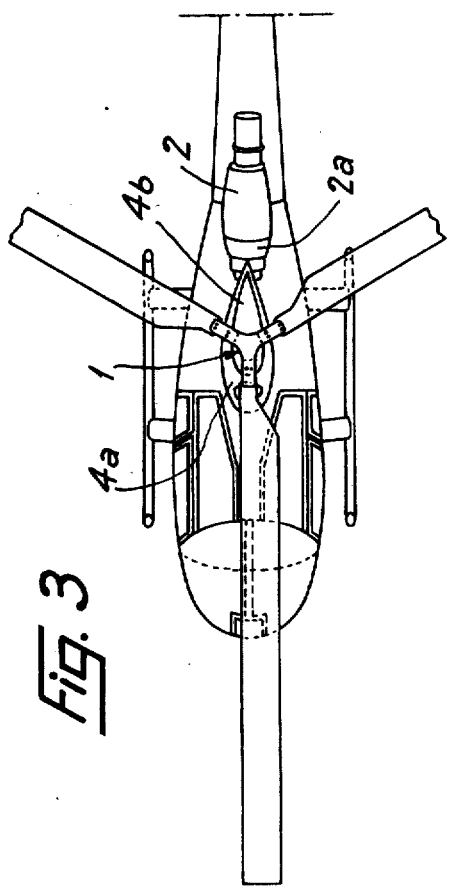

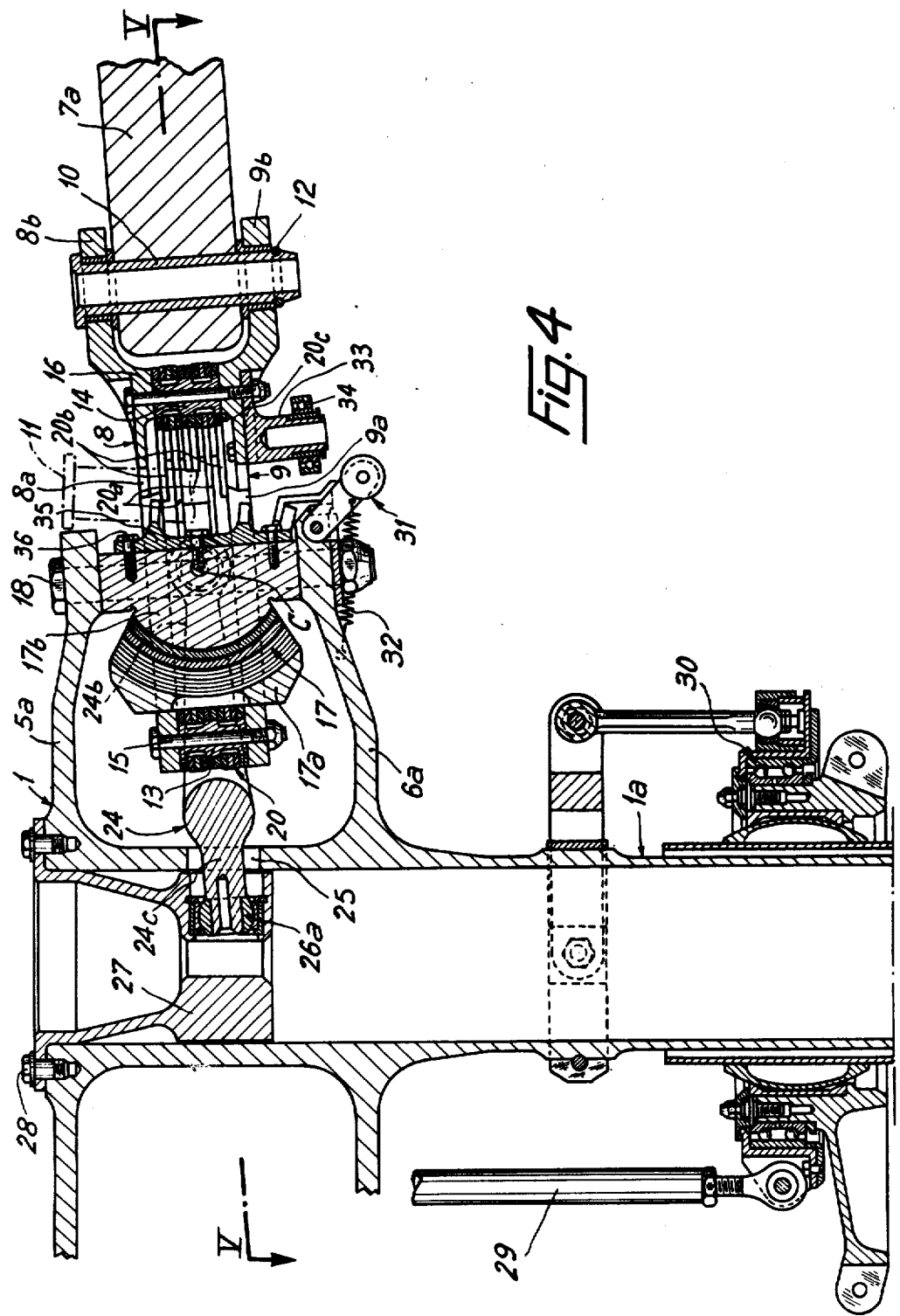

ROTARY-WING AIRCRAFT ROTOR HAVING A COMPACT ARTICULATED HUB

DESCRIPTION

The invention relates to a rotary-wing aircraft rotor comprising a very compact articulated hub.

U.S. Pat. No. 3,967,918 describes a rotary-wing aircraft rotor having a hub connected to each blade by a yoke which grips the blade root and a spherical laminated abutment secured near its centre to at least one radial arm of the hub and bearing at its convex side against the inner end of the yoke. In the embodiment described in the aforementioned Patent, the yoke itself consists mainly of two rigid plates gripping the corresponding blade root. The known rotor hub is star-shaped and has a connecting arm for each rotor blade, the arm being flattened in the plane of the star and flexible in the direction perpendicular to the aforementioned plane. The spherical laminated abutment is compressed between the ends of the yoke plates and the outer edge of an aperture formed in the hub at the base of the corresponding arm. The end of each hub arm is in sliding, rotating co-operation with the base of the yoke. In the embodiment described in the aforementioned Patent, the two parallel rigid plates, which are the main components of the yoke, surround a sliding ball bearing for the end of the corresponding hub arm, with interposition of two plates of visco-elastic material forming a frequency-matching device. A blade pitch control lever substantially parallel to the rigid plates of the corresponding yoke has an outer end secured to the base of the aforementioned yoke and an inner end substantially in the plane perpendicular to the blade axis and extending through the centre of the spherical abutment. Since the abutment is substantially level with the outer edge of the aperture formed in the hub at the base of the corresponding arm, the link coupling the aforementioned inner end of the pitch control lever associated with the blade in question is inevitably disposed, together with the cyclic pitch-control plate at a relatively considerable distance from the rotor strut.

The invention can be used to construct a rotary-wing aircraft rotor corresponding to the aforementioned known rotor by comprising a much more compact hub, so that streamlining having small maximum cross-sections can if required be fitted on the hub and between the hub and fuselage, even if the second streamlining is adapted to cover at least some components of the rotor pitch control device, inter alia the cyclic plate and the links coupled thereto.

The rotary-wing aircraft rotor according to the invention also comprises a hub connected to each blade via a yoke mainly comprising two rigid plates gripping the blade root and a spherical laminated abutment secured near its centre to at least one radial arm of the hub and bearing, on its convex side, against the inner end of the yoke. The rotor according to the invention is characterised in that an annular visco-elastic shock-absorber comprising an alternating stack of at least two metal plates and at least one layer of visco-elastic material secured by vulcanization or sticking to the plates and having great rigidity and high remanence to deformation, is disposed between the yoke associated with each blade and a device for controlling the pitch of the corresponding blade.

Owing to the aforementioned feature of the invention, the annular visco-elastic shock-absorber can be brought near the spherical abutment, so that it is no longer necessary to prolong the rotor hub arms far beyond the centre of the spherical abutment, nor consequently to ensure sliding and rotary co-operation between the end of each hub arm and the base of the yoke. A considerable reduction can be made in the radial length of the yoke, particularly in the length of the rigid plates forming its main component. It is therefore no longer necessary to provide a pitch control lever substantially parallel to the rigid yoke plates; on the contrary, the pitch control device for each blade can be directly secured to the yoke via a visco-elastic shock-absorber, substantially at the level of the centre of the spherical abutment, so that the various components of the pitch control device, inter alia the links coupled to the cyclic plate, can be brought much nearer the rotor strut. The rotor hub according to the invention, therefore, has greatly reduced radial bulk, resulting in a considerable reduction in the hub drag and consequently, at a given air-craft speed, a reduction in energy consumption and the possibility of increasing its maximum speed. Since the hub is small it can easily be streamlined if required. Finally, if streamlining is provided between the fuselage and the rotor hub, the streamlining can also include the cyclic pitch-control plate and the links coupled thereto, insofar inter alia as the links can be disposed in the immediate neighbourhood of the rotor strut. To this end, according to the invention, use can be made of streamlining having a small maximum cross-section. This, in addition to the previously-mentioned advantages resulting from reducing the rotor drag, prevents the formation of vortices capable of interfering with the aerodynamic operation of the rear aircraft rotor or with the supply to the motor air inlets, when the latter are disposed just behind the rotor strut.

In a preferred embodiment of the rotor according to the invention, the flat annular visco-elastic shock-absorber is inserted between the two rigid yoke plates so as to surround the spherical laminated abutment and so that the centre of the spherical abutment is practically identical with the centre of the flat ring; articulating bearings secured to the visco-elastic shock-absorber are inserted between the yoke associated with each blade and the pitch control device of the corresponding blade; the pitch control device can comprise a stirrup having two arms pivotably mounted in the two respective articulating bearings of the corresponding yoke; preferably the axles of the articulating bearings of each yoke are in line and extend through the centre of the corresponding spherical abutment; that part of the stirrup situated near the hub body can then have a central projection mounted on a sliding ball-joint inside or in the immediate neighbourhood of the hub body, whereas the projection can have a side connecting means, likewise very near the hub body, for a blade pitch control link, which is substantially parallel to the hub axis and can thus be disposed in the immediate neighbourhood of the rotor strut.

Finally, the rotor according to the invention can have a particularly advantageous embodiment comprising foldable blades. In the last-mentioned embodiment, each blade root is connected to the corresponding yoke by two pins, one being movable, and a recess is formed in the yoke to insert the removable pin, so as to secure the spherical abutment to the yoke when the blade is bent towards the rear of the aircraft, by pivoting the blade around the corresponding immovable pin.

By way of example, the following is a description, diagrammatically illustrated in the accompanying drawings, of an embodiment of a helicopter rotor according to the invention. In the drawings:

FIGS. 1 and 2 and 3 are a view in elevation, a front view and a plan view respectively of a helicopter equipped with a main rotor according to the invention;

FIG. 4 is a partial view of the top part of the rotor strut of the helicopter in FIGS. 1-3 and the associated hub, in section through an axial plane extending through the root of a blade.

Figure 5:
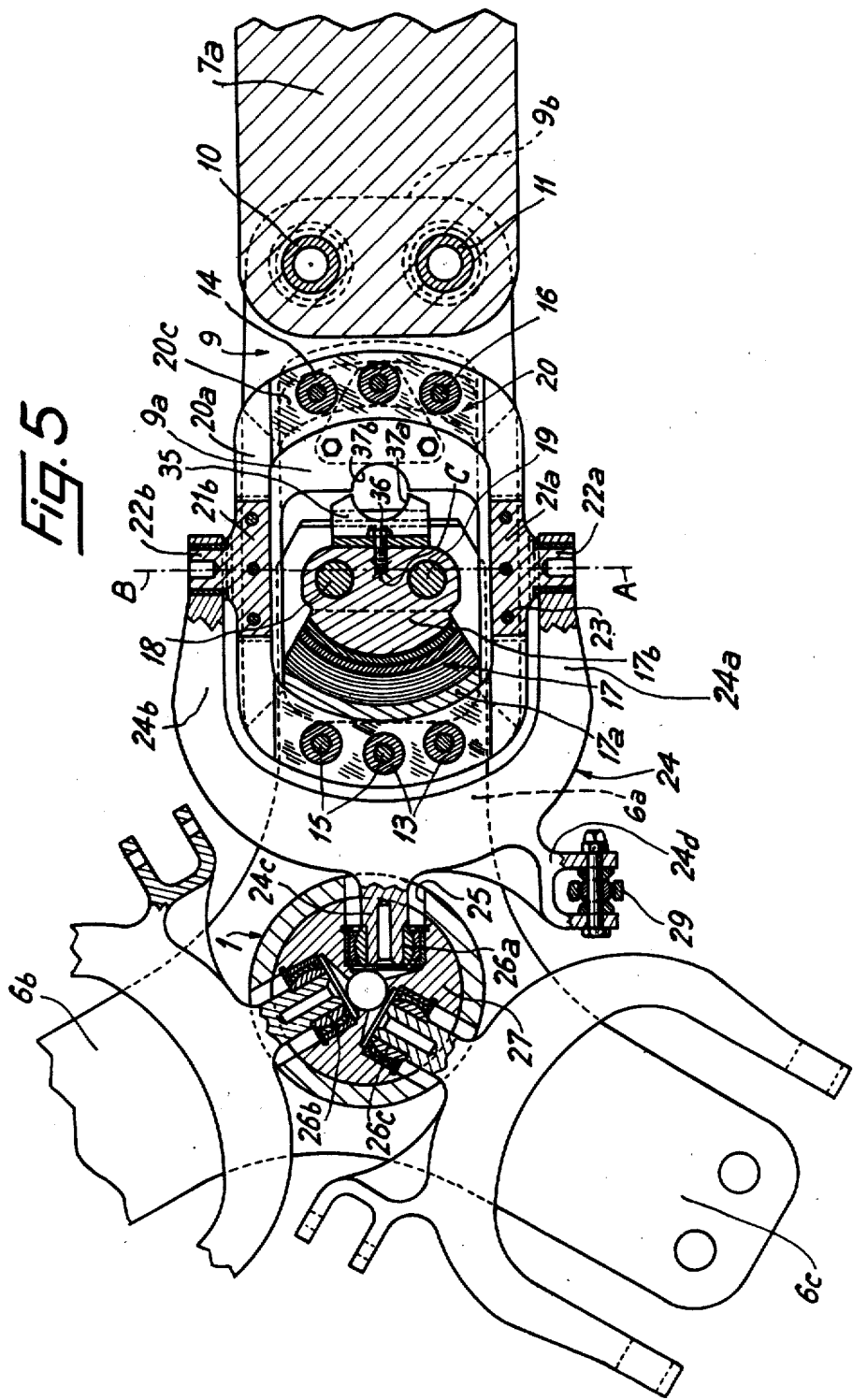
FIG. 5 is a view in section along the line V—V of FIG. 4.

FIG. 1 shows a helicopter having a three-bladed main rotor according to the invention, having a hub 1. 2 denotes a streamlined turbine for driving the main rotor (hub 1) and a rear rotor 3. Turbine 2 and its streamlining are borne by the rear part of the cabin, which also bears a streamlined portion in two superposed parts. The bottom streamlined part 4a surrounds the gearbox, which is disposed between (a) the turbine output shaft and (b) the main rotor strut (not shown) and the shaft (not shown) for transmitting motion to the rear rotor 3. The top streamlined portion 4b extends to just below the main rotor hub 1. The top portion completely surrounds the top part of the main rotor hub and the pitch control device (not shown). The double streamlined portion 4a-4b, however, has only a small aerodynamic drag, because of its small maximum cross-section (FIG. 2) and aerodynamic profile (FIG. 3). As already stated, the small drag of part 4a-4b reduces the energy consumption of the helicopter at a given speed, or increases its maximum speed. In addition, owing mainly to the aerodynamic shape shown in FIG. 3, the streamlined portion 4a-4b reduces the wake, i.e. the strength of the vortices formed behind the streamlined portion, thus improving the aerodynamic operation of the rear rotor 3 and facilitating the supply of air to the intake 2a at the front of the streamlined turbine 2.

In the embodiment shown in detail in FIGS. 4 and 5, the rotor hub 1 mainly comprises the top end of a steel or titanium tubular strut 1a. The three-bladed rotor hub 1 also has three pairs of superposed radial arms. FIG. 4 mainly shows the pair of superposed radial arms 5a, 6a corresponding to blade 7a; FIG. 5 only shows the three bottom radial arms 6a, 6b and 6c. Each radial arm (e.g. 5a or 6a) is preferably secured to hub 1, e.g. by integrally forging therewith, and has a small radial length, e.g. about 1.5 times the outer diameter of rotor strut 1a. Each pair of radial arms, e.g. 5a and 6a, is connected to the corresponding blade root 7a by a yoke, mainly comprising two rigid, preferably metal plates 8 and 9. Each plate is substantially rectangular and has a wide aperture 8a or 9a and the two plates are interconnected, in a manner which will be described hereinafter, so that their ends form a fork 8b, 9b (FIG. 4) gripping the blade root 7a. In the embodiment under consideration, the blade root 7a is secured to fork 8b, 9b by two pins 10 and 11 extending through matching apertures in components 7a, 8b and 9b. Pin 10 is secured e.g. by a retaining ring 12 or nut, whereas pin 11 is removably secured by appropriate means, e.g. a metal catch (not shown). The recessed parts of the two rigid plates 8, 9 are held apart by substantially tubular spacers 13, 14 through which assembly bolts 15, 16 extend. A spherical abutment 17, preferably a known kind of laminated abutment comprising an alternating stack of rigid metal and elastomer strips in the form of spherical caps vulcanized together, is fitted into the apertures 8a, 9a in the yoke plates 8,9 on the same side as that end of the yoke which is nearest the rotor hub 1. Abutment 17 is fitted between two rigid, preferably metal fittings. Fitting 17a, which matches the convexity of abutment 17, has surfaces adapted to bear against the corresponding edges of apertures 8a, 9a in plates 8 and 9, as shown in FIG. 4. Fitting 17b is mounted in the concave portion of abutment 17 and is prolonged, towards the geometrical centre C of the spherical abutment 17, by a component having practically the same height as the distance between the facing surfaces of the ends of the two radical arms 5a, 6a of hub 1. The last-mentioned component of fitting 17b is formed with two substantially vertical, parallel apertures receiving two bolts 18, 19 for securing abutment 17 and its fittings, inter alia 17b, to the ends of the radial arms 5a and 6a.

In the last-mentioned embodiment of the invention, a flat annular visco-elastic shock-absorber (general reference 20) is inserted between the two rigid yoke plates 8, 9 so as to follow the edges of their two respective apertures 8a, 9a and thus surround abutment 17. Shock-absorber 20 mainly comprises an alternating stack of metal plates 20a, 20b and elastomer layers 20c, having high rigidity and high remanence, the set of plates and layers being vulcanized or stuck together. The components 20a, 20b, 20c of the alternating stack are threaded, via appropriate apertures. on spacers 13 and 14, so that assembly bolts 15, 16 of yoke 8-9 are also used for securing the flat annular shock-absorber between the yoke plates 8, 9. Spacers 13 and 14, which are substantially cylindrical, have annular recesses adapted to secure plates 20b but leave sufficient clearance for plates 20a to move relative thereto.

Metal blocks 21a, 21b having lateral cylindrical journals 22a, 22b are inserted between metal elements 20a of shock-absorber 20 near the middle of the major sides of apertures 8a, 8b in plates 8 and 9. Blocks 21a, 21b are secured e.g. by screws 23 to elements 20a, so that the cylindrical journals 22a, 22b project from the sides of shock-absorber 20. The assembly is disposed so that the axes A and B of journal 22a, 22b are aligned and extend exactly through the geometrical centre C of the spherical abutment 17.

In the embodiment under consideration, journals 22a, 22b serve as articulating bearings, secured to shock-absorber 20, for the two arms 24a, 24b of a stirrup-shaped component 24 of the device for controlling the pitch of blade 7a. That part of element 24 which is near the body of rotor hub 1 has a central projection 24c extending through an appropriate orifice 25 in the wall of hub 1, whereas its end is slidably mounted in a ball joint 26a. The three ball joints 26a correspond to the respective stirrups associated with the three rotor blades 7a and are disposed in a component 27 fitting into the top aperture of hub 1, component 27 being secured to the top of the hub, e.g. by screws 28. Each stirrup-shaped component 24 also has a connecting means 24d at one side, very near the hub body 1, for a link (e.g. 29 on FIG. 4) for controlling the pitch of the corresponding blade. FIG. 5 shows a well-known embodiment of the joint between the top end of link 29 and the connecting means 24d. Since the connecting means 24d are very close to hub body 1, the pitch control links 29, which are substantially parallel to the rotor axis, can thus be disposed in the immediate neighbourhood of rotor strut 1a. As shown at the bottom of FIG. 4, the rotating cyclic plate 30 coupled to the bottom ends of links 29 may also have an outer diameter slightly greater than that of strut 1a. For these various reasons, the top streamlined portion 4b (FIGS. 1 to 3) can completely cover the various pitch control links 29 and plate 30 without being given very large transverse dimensions, and thus obtaining the previously-mentioned advantages.

A bottom abutment 31 is pivotably mounted at the end of the bottom radial arm 6a. A spring 32 holds it in the low position when the rotor is at rest or rotates very slowly, in which case a projection 33, which is secured below the bottom yoke plate 9 and preferably has a ball bearing 34 at its bottom end, comes in contact with abutment 31 when blade 7a is no longer subjected to sufficient centrifugal force to compensate its weight. At high rotor speeds, on the other hand, abutment 31 is spread out by centrifugal force, which acts against spring 32. Ball bearing 34, when interposed between projection 33 and abutment 31, facilitates varying the pitch of the corresponding blade 7a when the rotor is stopping, by reducing friction at abutment 31. An identical top abutment can be mounted at the end of the top radial arm 5a, but is not necessary except for starting the rotor in a high wind, more particularly on oil rigs.

During normal helicopter flight, the rotor illustrated in FIGS. 4 and 5 as described hereinbefore operates as follows:

The centrifugal forces resulting from the rotation of blade 7a are transmitted by its root to plates 8, 9 via pins 10 and 11, and then to fitting 17a of abutment 17, and finally to fitting 17b. Since member 17b is rigidly secured to the radial arms 5a and 6a, it directly absorbs the forces, which reach equlibrium in hub 1 with the centrifugal forces corresponding to the other blades.

Beating of each blade 7a (in the plane of FIG. 4) and drag motion (in the plane of FIG. 5) are allowed by elastic deformation, in the same planes, of the elastomer spherical caps in abutment 17. The two substantially perpendicular axes of the beat and drag movements intersect exactly at the geometrical centre C of abutment 17.

Angular beating of each blade around centre C is unrestricted. On the other hand, angular drag motion of each blade is obstructed by stirrup 24, and blade oscillation is filtered by the visco-elastic shock-absorber 20, disposed between the rigid plates 8, 9 and stirrup 24. As a result of the shearing of its elastomer layers 20c, shock-absorber 20 produces a powerful elastic return of the corresponding blade during drag, and simultaneously damps the corresponding motion or oscillation.

The pitch of blade 7a can be modified e.g. as follows. Plate 30 is pivoted, under the control of the helicopter pilot's cabin, thus e.g. exerting an increasing thrust on the bottom end of the corresponding link 29, whereupon the top end of the link exerts increasing thrust on the side connecting means 24d on component 24 (FIG. 5), which therefore pivots around the axis of its central projection 24c and the corresponding ball joint 26a, the pivoting motion being transmitted by the arms 24a, 24b of stirrup 24 and by the journals 22a, 22b to shock-absorber 20, with the result that its elastomer layers 20c are compressed. The pivoting motion is also transmitted to the root of blade 7a, which thus pivots around its longitudinal axis. Since the axes A, B of journals 22a, 22b extend through the geometrical centre C of abutment 17, there is no mechanical coupling between changes in blade pitch and beating thereof around an axis extending through centre C. If, on the other hand, it was desired to couple beating with changes of pitch, the geometrical centre C of abutment 17 could not be on the axes A, B of journals 22a, 22b.

The aforementioned advantages of the rotary-wing aircraft rotor according to the invention are due more particularly to the following reasons:

For a given distance between centre C of abutment 17 corresponding to each blade 7a and ball joint 26a (i.e. the footing distance of the corresponding blade), position of ball joint 26a inside the tubular hub 1, i.e. in the immediate neighbourhood of the geometrical axis of the rotor, makes possible that the blade root 17a can be brought near the hub. The pitch control links 29 can also brought near the rotor hub owing to the absence of coupling between beating and pitch changes of the blades. Since the shock-absorber 20 is combined with yoke 8-9, a reduction can be made in the maximum cross-section of the blade root and the yoke, more particularly when the blade is given a considerable pitch.

According to another advantageous feature of the previously-described embodiment of the invention, a component 35 is secured by screws 36 to the surface of fitting 17b facing the root of blade 7a. Complementary, substantially semi-circular recesses 37a, 37b are formed in component 35, inter alia in a top and bottom flange extending from component 35, and in the adjacent edges of apertures 8a, 9a in rigid plates 8, 9 respectively. When the rotor is inoperative, the removable pin 11 can be separated from the corresponding blade root 7a and fitted into the complementary recesses 37a, 37b as shown by broken lines in FIG. 4, in which position pin 11 secures abutment 17, more particularly fitting 17b, with respect to the rigid yoke plates 8 and 9. The yoke is consequently substantially secured relative to hub 1, so that blade 7a can be bent towards the rear of the helicopter by pivoting it around the immovable pin 10, which remains in position.

The invention is not limited to the previously-described embodiment, but includes all variants. Streamlining 4b is optional; on the other hand the rotor hub 1 may itself be appropriately streamlined. The visco-elastic shock-absorber can have various embodiments. It need not be a flat ring inserted between the two rigid yoke plates so as to surround the spherical abutment. According to the invention, it is only necessary to dispose it between the yoke associated with each blade and the device for controlling the pitch of the corresponding blade. The rotor hub 1 can be of metal and integral with the rotor strut 1a. Alternatively, the rotor hub 1 can be made in known manner of laminated material and secured, e.g. by bolts, to the top of strut 1a.

What I claim:

1. A rotary wing aircraft rotor comprising
   a compact articulated hub secured to a top part of a tubular strut rotating around a rotor rotation axis,
   at least two blades connected to said hub, said hub having for each blade a pair of superposed radial arms connected to a corresponding blade root by means of a single spherical laminar abutment including an alternating stack of rigid and elastomer strips in the forms of spherical caps secured together,
   a yoke including two rigid plates, the radial outer ends of which form a fork to which said corresponding blade root is secured by at least a pin wherein each of said two rigid yoke plates has a radial inner recessed part having a wide aperture, said radial inner recessed parts being held apart by means of at least one radial inner and one radial outer tubular spacers, and said spherical laminar abutment is fitted into said apertures of said yoke plates, with a concave portion of said spherical abutment being mounted on a radial outer rigid fitting prolonged towards the center of said spherical abutment by a radial outer component extending through said apertures and secured between the radial outer ends of said radial arms, and a convex portion of said spherical abutment being mounted on a radial inner rigid fitting bearing against the corresponding inner edges of said apertures of said yoke plates, and wherein, for each blade a flat annular visco-elastic shock-absorber is inserted between said corresponding two rigid yoke plates so as to surround said single spherical abutment, said flat annular visco-elastic shock absorber including an alternating stack of at least two rigid plates and at least one layer of a visco-elastic material having great rigidity and high remanence to deformation, each layer of said visco-elastic material being secured between and to two of said shock-absorber rigid plates, and said shock-absorber being disposed between and journaled on two arms of a stirrup-shaped component connected to a top end of a blade pitch control link so that beat or flap drag and pitch motions of each blade are allowed by elastic-deformation of said elastomer strips of said single spherical laminar abutment and that said shock absorber produces an elastic return and a damping action on the drag motion of said corresponding blade.

2. A rotary wing aircraft rotor as in claim 1, wherein said flat annular visco-elastic shock absorber is inserted between said corresponding two rigid yoke plates so as to follow the edges of said respective apertures of said yoke plates and so that the center of said spherical abutment is substantially identical with the center of said annular shock absorber.

3. A rotary wing aircraft rotor as in claim 1 or 2, wherein said shock absorber rigid plates and layers of a visco-elastic material are threaded via appropriate apertures on said spacers through which assembly bolts extend for securing said yoke plates on said spacers and said flat annular shock-absorber between said yoke plates.

4. A rotor wing aircraft rotor as in claim 1 or 2, wherein said spacers are substantially cylindrical and have recesses adapted to secure two end rigid plates of said alternating stack of said annular shock absorber and to leave clearance for at least two inside rigid plates of said alternating stack of said annular shock absorber to move relative thereto.

5. A rotary wing aircraft rotor as in claim 4, wherein said shock absorber is journaled on said two arms of said stirrup-shaped component by means of two cylindrical journals forming articulating bearings and projecting laterally each from one of two rigid blocks inserted between and secured to two of said inside rigid plates of said shock absorber.

6. A rotary wing aircraft rotor as in claim 5, wherein said articulating bearings have axes which are in line and extend through said center of said corresponding spherical laminar abutment.

7. A rotary wing aircraft rotor as in claim 5, wherein said articulating bearings have axes which are in line and said center of said corresponding spherical laminar abutment is outside said axes so as to produce conjugated beat or flap and pitch motion of said corresponding blade.

8. A rotary wing aircraft rotor as in claim 1, wherein said two arms of said stirrup-shaped component are linked together by a radial inner part of said stirrup shaped component which is near said hub and has a central projection slidably and pivotally mounted on said hub and a side connecting means for connection to said top end of said pitch control link extending substantially parallel to said rotor axis in the immediate neighborhood of said tubular strut.

9. A rotary wing aircraft rotor as in claim 8, wherein said central projection extends through an orifice in the wall of said hub and has a radial inner end slidably mounted in a ball joint disposed in a component fitted and secured into a top aperture of said hub.

10. A rotary aircraft rotor as in claim 1, wherein each said blade root is connected to said corresponding fork formed by said radial outer ends of said corresponding yoke rigid plates by two pins one of which is a removable pin, the surface of said component prolonging said radial outer fitting which faces said blade root and the adjacent edges of said yoke rigid plates apertures presenting complementary substantially semi-circular recesses formed for receiving said removable pin to secure said yoke with respect to said hub when the rotor is inoperative, so as to allow said corresponding blade to be pivoted around the other pin which is immovable.

* * * * *